US010781866B2

(12) United States Patent
Avdusinovic

(10) Patent No.: US 10,781,866 B2
(45) Date of Patent: Sep. 22, 2020

(54) ACTUATOR WITH MEANS AGAINST RADIAL REMOVAL OF SECURING ELEMENT

(71) Applicant: Bühler Motor GmbH, Nuremberg (DE)

(72) Inventor: Toni Avdusinovic, Nuremberg (DE)

(73) Assignee: BÜHLER MOTOR GMBH, Nuremberg (DE)

( * ) Notice: Subject to any disclaimer, the term of this patent is extended or adjusted under 35 U.S.C. 154(b) by 0 days.

(21) Appl. No.: 16/167,851

(22) Filed: Oct. 23, 2018

(65) Prior Publication Data
US 2019/0055996 A1 Feb. 21, 2019

Related U.S. Application Data

(63) Continuation of application No. PCT/DE2017/200033, filed on Apr. 13, 2017.

(30) Foreign Application Priority Data

Apr. 27, 2016 (DE) .................. 10 2016 207 155

(51) Int. Cl.
*F16D 23/14* (2006.01)
*F16B 21/18* (2006.01)
(Continued)

(52) U.S. Cl.
CPC ............ *F16D 23/14* (2013.01); *F16B 21/186* (2013.01); *H02K 7/06* (2013.01); *H02K 7/10* (2013.01);
(Continued)

(58) Field of Classification Search
CPC .......... F16D 23/14; F16D 13/22; F16D 11/14; F16H 1/20; F16H 2200/0021; F16B 21/186
See application file for complete search history.

(56) References Cited

U.S. PATENT DOCUMENTS 2,926,033 A * 2/1960 Zarrillo ................. F16B 21/186
403/326
4,266,646 A * 5/1981 Telford ................... B60B 35/14
192/69.43
(Continued)

FOREIGN PATENT DOCUMENTS

GB        2 321 945 A      8/1998

OTHER PUBLICATIONS

International Search Report dated Aug. 4, 2017, issued in counterpart International Application No. PCT/DE2017/200033 (3 pages).
(Continued)

*Primary Examiner* — Stacey A Fluhart
(74) *Attorney, Agent, or Firm* — Westerman, Hattori, Daniels & Adrian, LLP

(57) ABSTRACT

An actuator, having an electric motor, a reduction gear, a clutch, and a manual mechanical clutch release system, comprising a clutch spring, a plunger, a spring retainer plate, and a securing element, which is arranged in a groove of the plunger. The object of the invention is to ensure, for a common actuator, that there is always a reliable mechanical connection of the mechanical clutch release system, even under rough environmental conditions, wherein no additional parts are required, to the extent possible, and an economical production and assembly is possible.

10 Claims, 5 Drawing Sheets

(51) Int. Cl.
*H02K 7/06* (2006.01)
*H02K 7/10* (2006.01)
*H02K 7/108* (2006.01)
*F16D 23/12* (2006.01)
*F16H 25/20* (2006.01)

(52) U.S. Cl.
CPC ....... *H02K 7/108* (2013.01); *F16D 2023/126* (2013.01); *F16H 2025/2071* (2013.01)

(56) References Cited

U.S. PATENT DOCUMENTS

| | | | | |
|---|---|---|---|---|
| 4,314,500 | A * | 2/1982 | Hoppe | F42B 15/36 |
| | | | | 102/378 |
| 5,127,764 | A | 7/1992 | Baer | |
| 5,816,732 | A * | 10/1998 | Nissen | F16G 11/06 |
| | | | | 403/327 |
| 6,792,823 | B2 * | 9/2004 | Takahashi | B41J 3/4075 |
| | | | | 403/316 |
| 7,220,075 | B2 * | 5/2007 | Herchenbach | A01B 71/06 |
| | | | | 403/327 |
| 2014/0033844 | A1 * | 2/2014 | Rothvoss | F16H 3/16 |
| | | | | 74/335 |
| 2015/0128939 | A1 * | 5/2015 | Antoine | A61M 16/01 |
| | | | | 128/203.12 |
| 2015/0308488 | A1 * | 10/2015 | Kahl | F16B 43/00 |
| | | | | 411/544 |
| 2017/0334500 | A1 * | 11/2017 | Jarek | B62K 11/04 |

OTHER PUBLICATIONS

Buehlermotor: "Take a Seat in Cooperation with Dornier Technologie Systems GmbH PAXCOM—Seat Control and Actuation System", Jul. 27, 2017, pp. 1-20. Cited in ISR. (21 pages).

* cited by examiner

ACTUATOR WITH MEANS AGAINST RADIAL REMOVAL OF SECURING ELEMENT

CROSS-REFERENCE TO RELATED APPLICATIONS

The present patent application is a continuation of International Publication No. WO2017186240, filed Apr. 13, 2017, which is based on, and claims priority from German Application No. DE 10 2016 207 155.6, filed Apr. 27, 2016, both of which are incorporated herein by reference in their entireties.

BACKGROUND OF THE INVENTION

(1) Field of the Invention

The invention relates to an actuator, having an electric motor, a reduction gear, a clutch, and a manual mechanical clutch release system.

(2) Description of Related Art Including Information Disclosed Under 37 CFR 1.97 and 1.98

With a known actuator from Büler Motor GmbH, a spring retainer plate is formed with only one edge; this is used only to facilitate assembly of the clutch spring. The securing element is assembled without additional securement. With strong jolting, impacts, etc. however, it is not certain that the securing element will remain in the assembled position under all tolerance conditions. In this case, the mechanical clutch release system is no longer functional.

BRIEF SUMMARY OF THE INVENTION

The invention relates to an actuator, having an electric motor, a reduction gear, a clutch, and a manual mechanical clutch release system, including a clutch spring, a plunger, a spring retainer plate, and a securing element, which is arranged in a groove of the plunger wherein the spring retainer plate is used as a means to secure against radial disassembly of the securing element.

The object of the invention is to ensure, for a common actuator, that there is always a reliable mechanical connection of the mechanical clutch release system, even under rough environmental conditions, wherein no additional parts are required, to the extent possible, and an economical production and assembly is possible.

Through the particular shape of the spring retainer plate, there is always a reliable attachment of the securing element, even under rough conditions, such as vibration and shock loads. Because the spring retainer plate itself is used as a securing means, no additional part is necessary, whereby an economical production results.

As known in the prior art, a joining edge enables the assembly of the clutch spring to be executed more easily. The spring retainer plate according to the invention differs from the known design by means of a peripheral securing edge. It is used as a simple option to secure the securing element against undesired radial disassembly. To this end, the securing edge is matched to the outer diameter or the length of the securing element.

The securing element is preferably a retaining washer, which is accommodated in a groove of the plunger. As an alternative, a securing pin, a cotter pin, or a heavy-duty dowel pin can be used as the securing element, wherein they are accommodated in an opening in the plunger, which is designed similarly to a cross-hole.

In addition to the joining edge and the securing edge, the spring retainer plate comprises a plate section, which is used as the contact surface for the clutch spring.

The peripheral joining edge and the helical clutch spring are beneficially arranged on a first side of the plate section, and the securing edge and the securing element are arranged on an opposite second side of the plate section of the spring retainer plate.

BRIEF DESCRIPTION OF THE SEVERAL VIEWS OF THE DRAWINGS

An exemplary embodiment of the invention is explained in more detail below with reference to the drawing. The following is shown.

DETAILED DESCRIPTION OF THE INVENTION

Figure 1:
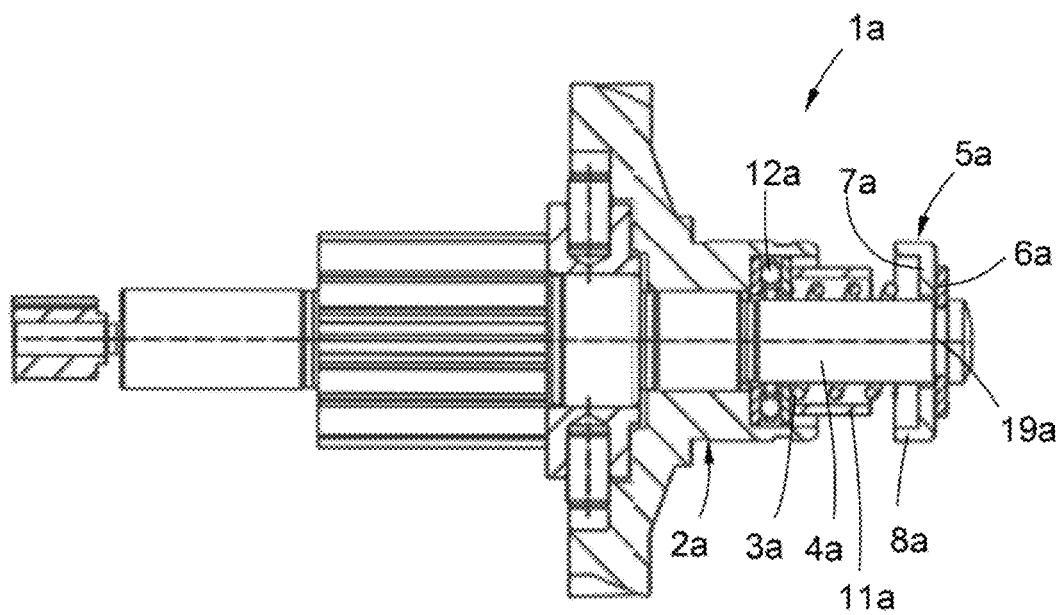
FIG. 1 shows a part of an actuator according to the prior art.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a part of an actuator 1a according to the prior art, having a mechanical clutch system 2a. The actuator 1a includes a helical compression clutch spring 3a, an elongated plunger 4a, a spring retainer plate 5a, a disk-shaped retaining washer 6a, with a plate section 7a and a joining edge 8a. The spring retainer plate 5a is used to pretension the clutch spring 3a in the axial direction and to retain it in this condition. The peripheral joining edge 8a is used to capture the clutch spring 3a during assembly. The retaining washer 6a is radially assembled in a groove 19a of the plunger 4a and holds the spring retainer plate 5a in the axial direction. A sleeve-like spacer 11a surrounding the plunger and spring is further shown, which limits the axial movement of the plunger 4a when the clutch is mechanically actuated in that the spring retainer plate 5a comes to rest against the spacer 11a. The spacer 11a is supported on an axial bearing 12a, which is designed in the form of an axial ball bearing about the plunger.

Figure 2:
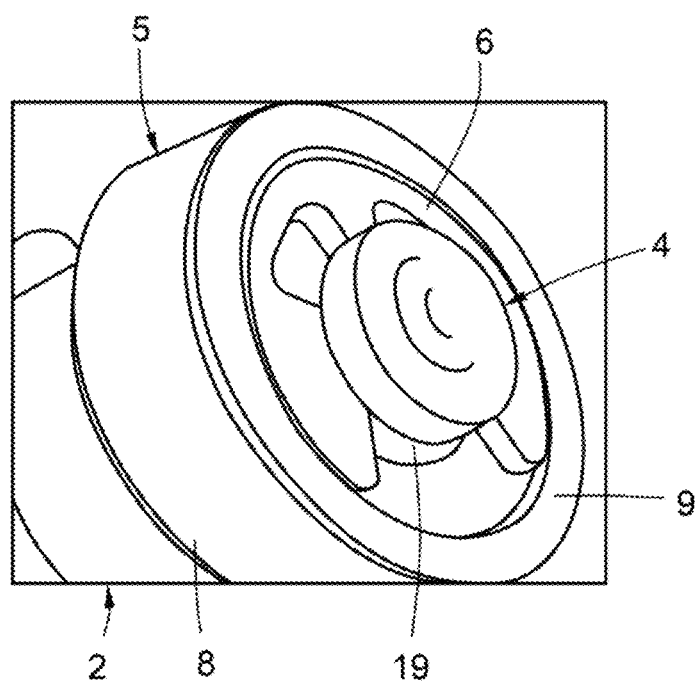
FIG. 2 shows a three-dimensional representation of a retaining washer according to the invention.

FIG. 2 shows a three-dimensional representation of a part of a mechanical clutch release system 2 according to the invention, having a spring retainer plate 5, an elongated plunger 4, and a retaining washer 6 for shafts, which is held, using positive locking, in a circumferential groove 19 of the plunger 4 in the axial direction, and is held, using friction locking, in the radial direction with a snap contour. The retaining washer 6 is a conventional retaining washer. The spring retainer plate 5 has a peripheral joining edge 8 on one side and a planar securing edge 9 on the other side. The planar securing edge 9 is matched to the outer diameter of the retaining washer 6 and secures the retaining washer radially against disassembly.

Figure 3:
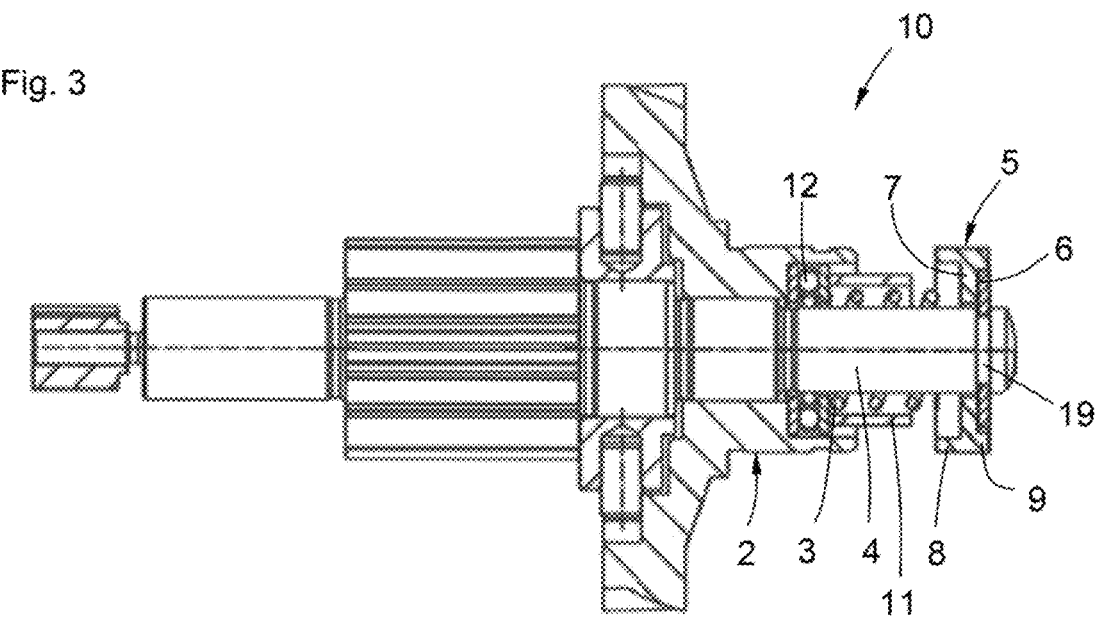
FIG. 3 shows a part of an actuator according to the invention.

FIG. 3 shows a part of an actuator 1 according to the invention, having a mechanical clutch release system 2, comprising the plunger 4 with the groove 19, a clutch spring 3, the spring retainer plate 5 with the joining edge 8 and the securing edge 9, the retaining washer 6, a spacer 11, and an axial bearing 12. The spring retainer plate 5 additionally has a planar plate section 7, which supports the helical compression clutch spring 3 on one side. The clutch spring 3 is supported on the axial bearing 12 on the other side. The plate section 7, the joining edge 8, and the securing edge 9 are formed as a single component.

Figure 4:
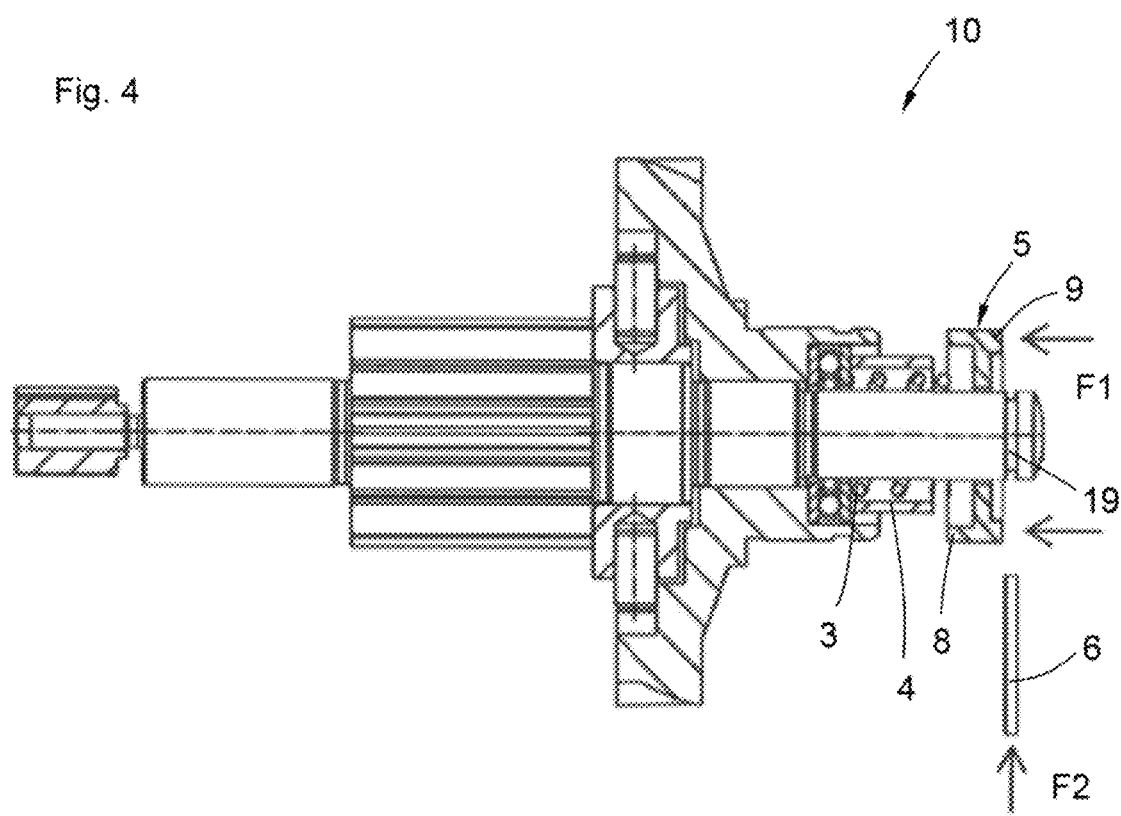
FIG. 4 shows a part of the actuator in an assembly situation.

FIG. 4 shows a part of the actuator 1 in an assembly situation, in which the spring retainer plate 5 is axially pushed against the force of the clutch spring 3 by means of axial force F1 to the extent that the securing edge 9 reveals the groove 19 for assembly of the retaining washer 6. By means of a radial movement with a joining force F2, the retaining washer 6 can then be guided and snapped into the groove 19 until a part of the retaining washer 6 is fastened in the groove 19. The force F1 can subsequently be reduced again such that the clutch spring 3 pushes the spring retainer plate 5 back toward the retaining washer 6. The condition according to FIG. 3 is then achieved. The plunger 4 and the joining edge 8 are further shown in FIG. 3.

Figure 5:
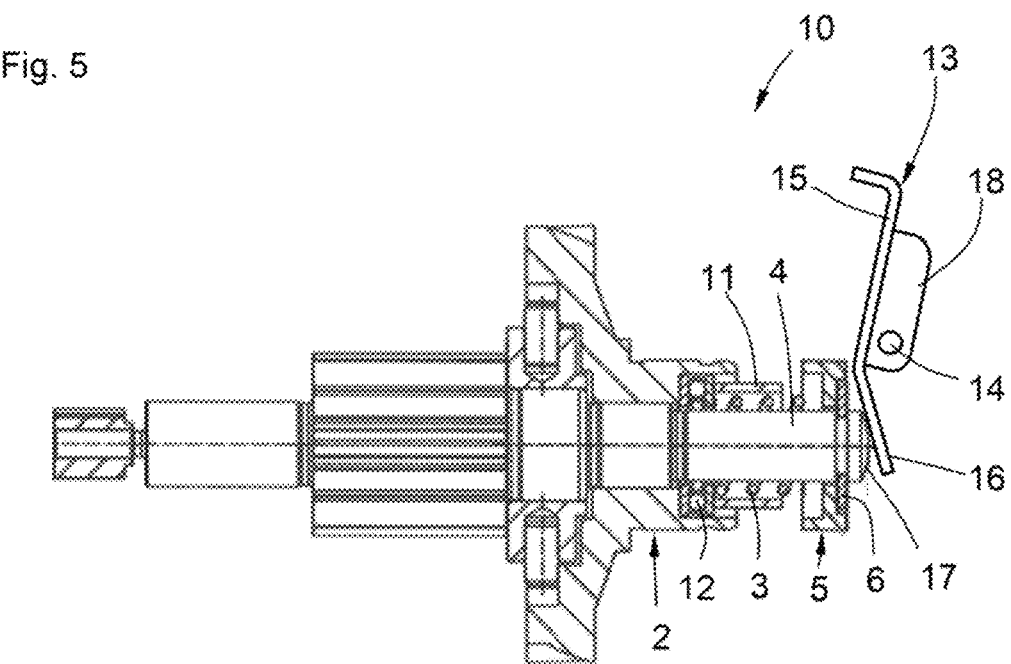
FIG. 5 shows a part of the actuator according to the invention with a clutch release lever.

FIG. 5 shows the mechanical clutch release system 2 as a part of the actuator 1 according to the invention, having a clutch release lever 13, which can be swiveled around a pivot point 14. A first lever arm 15 in this case is connected to a conventional Bowden cable (not shown), and a second lever arm 16 rests in a spring-loaded manner against a spherical end 17 of the elongated plunger 4. The clutch release lever 13 additionally has a stiffening cheek 18, which is angled and includes the pivot point 14. Furthermore, FIG. 5 shows the clutch spring 3, the spring retainer plate 5, the retaining washer 6, the spacer 11, and the axial bearing 12.

Figure 6:
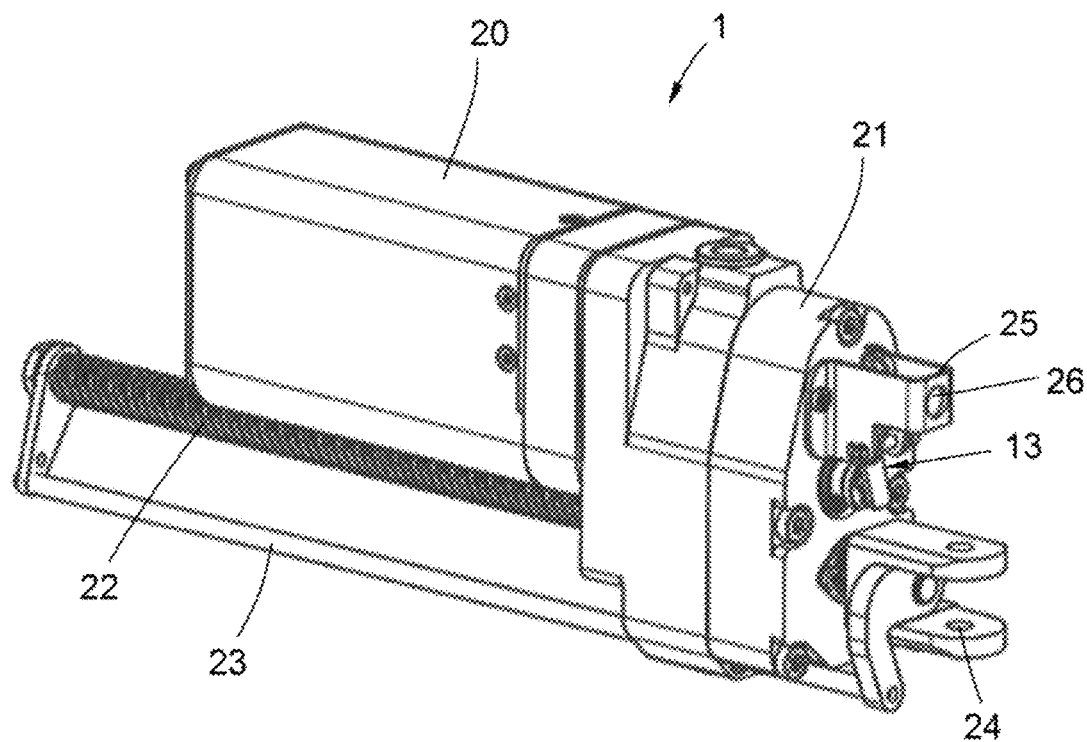
FIG. 6 shows an actuator with a clutch release lever.

FIG. 6 shows an assembled actuator 1 with the clutch release lever 13. The actuator 1 is used as a linear actuator in airplane seats and has the following: an electric motor 20, a gearbox housing 21 attached to a motor housing, in which a reduction gear and the clutch 10 according to the invention are accommodated. The reduction gear is operatively connected to the motor so that it rotates in response to the operation of the motor. The clutch is operatively connected to the reduction gear. An elongated spindle 22 can be driven by means of a nut as a component of the reduction gear in the gearbox housing 21. An elongated guide rod 23 moves along the spindle as the spindle turns. The guide rod 23 is attached to a joint 24 for attachment to an airplane seat. A support element 25 is secured to the gearbox housing 21 to accommodate the Bowden cable. The support element 25 is bent from a metal strip essentially into a U-shape and has an opening 26 for the Bowden cable, the end of which is connected to the clutch release lever 13 using positive locking.

Figure 7:
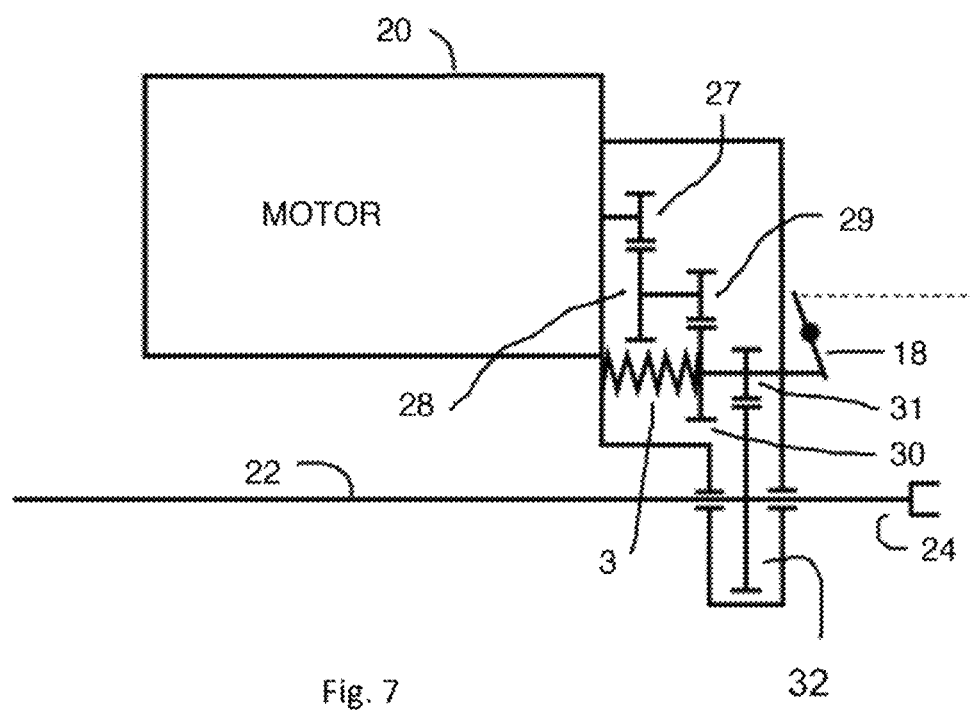
FIG. 7 is a schematic drawing of an example of a reduction gear in the gearbox housing.

FIG. 7 shows an example of a reduction gear found in the gearbox housing. The reduction gear consists of six gears 27-32 arranged in the following way. Gear 27 is connected to the motor 20. Gear 28 meshes with gear 27. A smaller gear 29 is connected to gear 28 so that the two gears rotate together. Gear 30 meshes with gear 29. A smaller gear 31 is connected to gear 30 so that the two gears rotate together. Gear 32 is connected to spindle 22 and meshes with gear 31.

Figure 8:
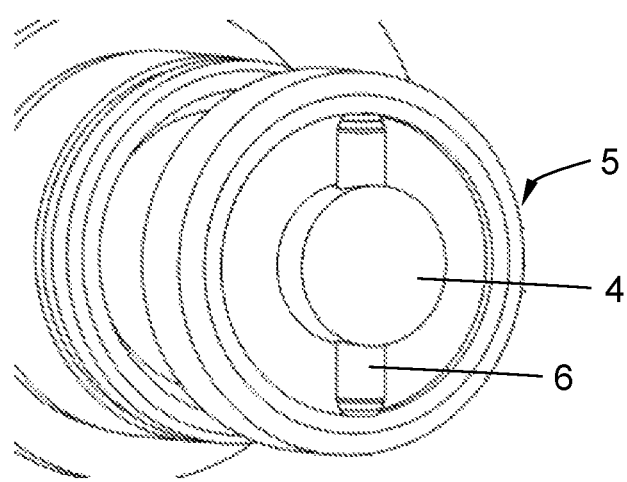
FIG. 8 shows a three-dimensional drawing of a cotter pin or retaining pin.
Figure 9:
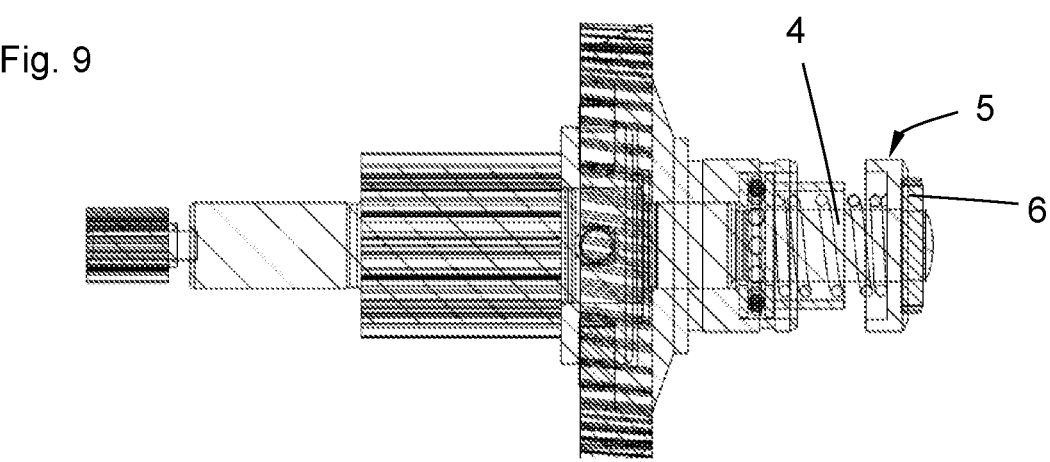
FIG. 9 shows a part of an actuator.

FIG. 8 is a perspective view showing a spring retainer plate 5, a plunger 4 having a hole formed therethrough, and a cotter pin or securing pin 6 provided in the hole. FIG. 9 is a side view illustrating the same.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS

1 Actuator
2 Mechanical clutch release system
3 Clutch spring
4 Plunger
5 Spring retainer plate
6 Securing element
7 Plate section
8 Joining edge
9 Securing edge
10 Clutch
11 Spacer
12 Axial bearing
13 Clutch release lever
14 Pivot point
15 First lever arm
16 Second lever arm
17 Spherical end
18 Stiffening cheek
19 Groove
20 Electric motor
21 Gearbox housing
22 Spindle
23 Guide rod
24 Joint
25 Support element
26 Opening
27-32 Gears

What is claimed is:

1. An actuator comprising:
an electric motor;
a reduction gear operatively connected to the electric motor;
a clutch operatively connected to the reduction gear; and
a manual mechanical clutch release system comprising
an elongated plunger having an end with a recess,
a clutch spring positioned on the plunger,
a spring retainer plate positioned on the plunger, and
a securing element, which is arranged in the recess of the plunger and is disposed in a concave portion of the spring retainer plate,
wherein the spring retainer plate is used as a means to secure against radial disassembly of the securing element, and
wherein the securing element abuts the spring retainer plate.

2. The actuator according to claim 1, wherein the securing element is a retaining washer and the recess is a peripheral groove.

3. The actuator according to claim 1, wherein the securing element is a securing pin.

4. The actuator according to claim 3, wherein the recess in the plunger is a hole through the plunger end.

5. The actuator according to claim 1, wherein the securing element is a cotter pin.

6. The actuator according to claim 1, wherein the spring retainer plate comprises a planar plate section having first and second sides, a joining edge secured to the plate section, and a securing edge secured to the plate section.

7. The actuator according to claim 6, wherein the joining edge and the clutch spring are arranged on the first side of the plate section, and the securing edge and the securing element are arranged on the second side of the plate section.

8. The actuator according to claim 1, wherein the planar plate section is substantially orthogonal to an axis of the plunger.

9. A seat, comprising:
the actuator according to claim 1.

10. The seat according to claim 9, wherein the seat is configured to be installed in an airplane.

* * * * *